(12) United States Patent
Kuo et al.

(10) Patent No.: US 7,826,159 B2
(45) Date of Patent: Nov. 2, 2010

(54) FOCUS MODULE AND METHOD FOR MANUFACTURING SAME

(75) Inventors: Pei-Ching Kuo, Taipei Hsien (TW);
Fang-Ying Peng, Taipei Hsien (TW);
Sheng-An Wang, Taipei Hsien (TW);
Peng-Shin Lee, Taipei Hsien (TW);
Tsung-Lin Tang, Taipei Hsien (TW);
Wei-Leun Fang, Taipei Hsien (TW)

(73) Assignee: Hon Hai Precison Industry Co., Ltd., Tu-Cheng, Taipei Hsien (TW)

( * ) Notice: Subject to any disclaimer, the term of this patent is extended or adjusted under 35 U.S.C. 154(b) by 5 days.

(21) Appl. No.: 12/477,872

(22) Filed: Jun. 3, 2009

(65) Prior Publication Data

US 2010/0172040 A1     Jul. 8, 2010

(30) Foreign Application Priority Data

Jan. 7, 2009     (CN) .................... 2009 1 0300104

(51) Int. Cl.
*G02B 7/02*     (2006.01)
(52) U.S. Cl. ........................................ 359/824; 359/822

(58) Field of Classification Search ......... 359/694–700, 359/811–824
See application file for complete search history.

(56) References Cited

U.S. PATENT DOCUMENTS 7,764,447 B2 * 7/2010 Shibazaki .................... 359/822

* cited by examiner

*Primary Examiner*—Mohammed Hasan
(74) *Attorney, Agent, or Firm*—Zhigang Ma

(57) ABSTRACT

The present disclosure provides a focus module including a substrate, a holder, at lease one second magnet, a frame and an elastic element. The substrate includes at least one first magnet and an aperture. The frame is fixed on the substrate and defining a hole receiving the holder. The second magnet is fixed on the holder. At least one of the first magnet and the second magnet is an electromagnet. The elastic element includes a first end, a second end, and at least one U-shape bend connected the first and second ends. The first end is fixed on the side surface of the holder. The second end is fixed on the inner surface of the hole. The two sides of the U-shape bend are parallel to the side surface of the holder and the inner surface of the hole. The present invention also provides a method for manufacturing the focus module.

14 Claims, 19 Drawing Sheets

FOCUS MODULE AND METHOD FOR MANUFACTURING SAME

BACKGROUND

1. Technical Field

The present disclosure relates to focus modules and, particularly, to a focus module and a fabrication method thereof.

2. Description of Related Art

The development of MEMS (Micro Electro Mechanical System) technology, has made microstructures, ultra-micro actuators, various ultra-micro sensors, micro optical parts, micro fluid devices and the like, easier to manufacture.

Recently, due to MEMS, electronic products with a camera module have become cheaper and thus more popular. However, the demand for ever smaller products that still include camera modules has increased but is difficult to meet because focus modules used in the camera cameras require gears, cams, motors and so on, which take up a lot of space.

What is needed, therefore, is a miniaturized focus module to overcome the above-described problem.

BRIEF DESCRIPTION OF THE DRAWINGS

Many aspects of the present focus module and the method for manufacturing the same can be better understood with reference to the following drawings. The components in the drawings are not necessarily drawn to scale, the emphasis instead being placed upon clearly illustrating the principles of the focus module and the method for manufacturing the same.

DETAILED DESCRIPTION

Embodiments of the present disclosure will now be described in detail below, with reference to the accompanying drawings.

Figure 1:
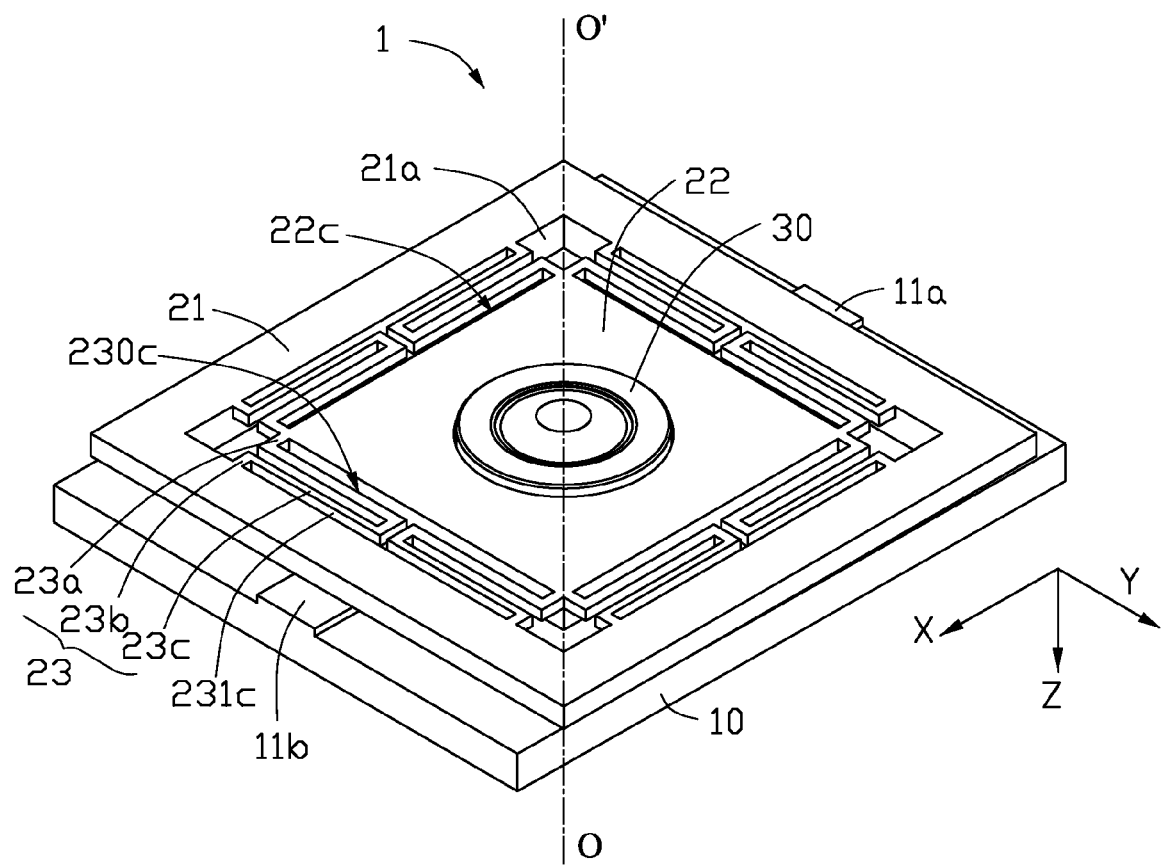
FIG. 1 is a schematic assembled view of a focus module according to an exemplary embodiment.
Figure 2:
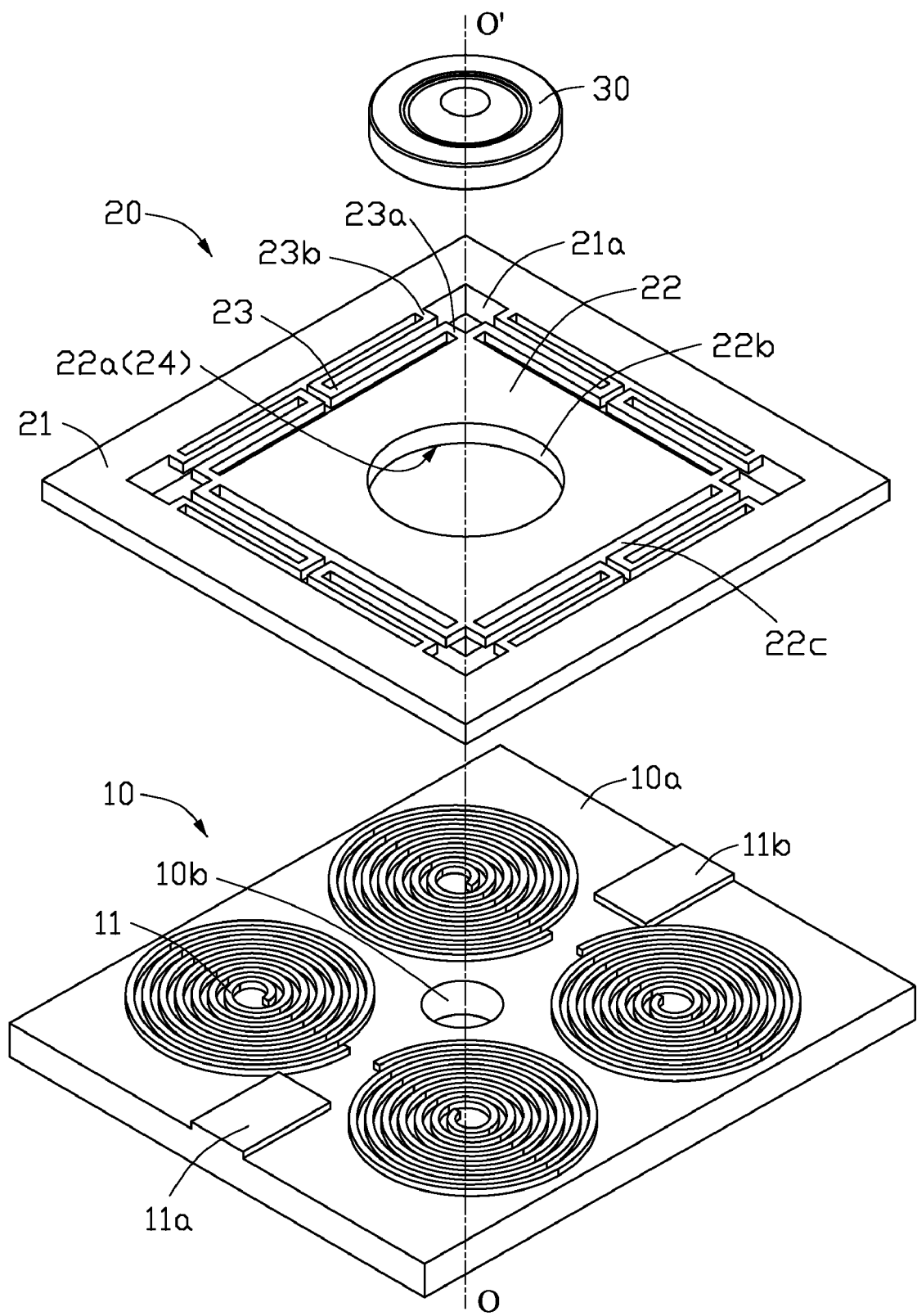
FIG. 2 is an exploded view of the focus module of FIG. 1.

Referring to FIGS. 1 and 2, a focus module 1, according to an exemplary embodiment, is shown. The focus module 1 includes a substrate 10, a moving element 20, and a lens 30.

In the present embodiment, the substrate 10 is a multi-layer composite board manufactured using semiconductor process technology. The shape of the substrate 10 is rectangular.

The substrate 10 has a first surface 10a, and defines an aperture 10b in the center of the substrate 10. Four first magnets 11 are fixed on the first surface 10a and symmetrically arranged around the aperture 10b. In other embodiments, only one annular shaped first magnet 11 is fixed on the first surface 10a at the center of the substrate surrounding the aperture 10b. The first magnets 11 may be electromagnetic coils or permanent magnets. In the present embodiment, the first magnets 11 are magnetic copper coils made by plating technology. The first magnets 11 include two signal input terminals 11a, 11b disposed on the two opposite fringes of the substrate 10. The signal input terminals 11a, 11b are electrically coupled to the first magnets 11 through a conductor layer (not visible) inside the substrate 10. A polarity of each first magnet 11 can be changed by changing the direction of current input via the signal imputing terminals 11a, 11b.

The moving element 20 is disposed on the first surface 10a of the substrate 10 and includes a frame 21, a holder 22, a number of elastic elements 23, and a second magnet 24.

The frame 21, the holder 22, and the elastic elements 23 may be integrally formed. In the present embodiment, the frame 21, the holder 22, and the elastic element 23 are made of silicon, and manufactured by semiconductor process technology. The frame 21 is attached to the signal input terminals 11a, 11b by glue. The frame 21 is substantially parallel to the substrate 10.

The frame 21 defines a rectangular hole 21a at the center thereof. The shape of the frame 21 is rectangular. The holder 22 is received in the rectangular hole 21a of the frame 21. The shape of the holder 22 is also rectangular. The holder 22 is connected to the frame 21 via the elastic element 23. The holder 22 defines a second surface 22a facing to the first surface 10a of the substrate 10, a holding hole 22b, and a side surface 22c. The lens 30 is received in the holding hole 22b and fixed with glue. The optical axis OO' of the focus module 1 is coaxial with the center of the holding hole 22b, the lens 30, and the aperture 10b.

The elastic element 23 is connected to the frame 21 and the holder 22. The elastic element 23 is strip-shaped. The cross section of each elastic element 23 is perpendicular to the optical axis OO'. The elastic elements 23 are each generally U-shaped and include a first end 23a, a second end 23b, and at least one U-shape bend 23c. Two sides 230c, 231c of the U-shape bend 23c are substantially parallel to the side surface 22c of the holder 22. The first end 23a is fixed to the side surface 22c of the holder 22. The second end 23b is fixed to the frame 21. In the present embodiment, the second end 23b is fixed to the side surface of the rectangular hole 21a.

Rigidity of the elastic element 23 is different along different directions, see X, Y, Z directions labeled in FIG. 1. In this embodiment, the rigidity of the elastic element 23 in the X direction is much greater than those in the Y and Z directions. The rigidity of the elastic element 23 at Z direction is much less than those at X direction and Y direction. Therefore the elastic elements 23 are easiest to deform in the Z direction, and accordingly, the holder 22 is easy to move along the optical axis OO'. In another aspect, because the elastic element is hard to deform at the surface defined by the X, Y directions which is perpendicular to the optical axis OO' of the focus module 1, a camera employing the focus module 1 can be anti-shake.

Figure 3:
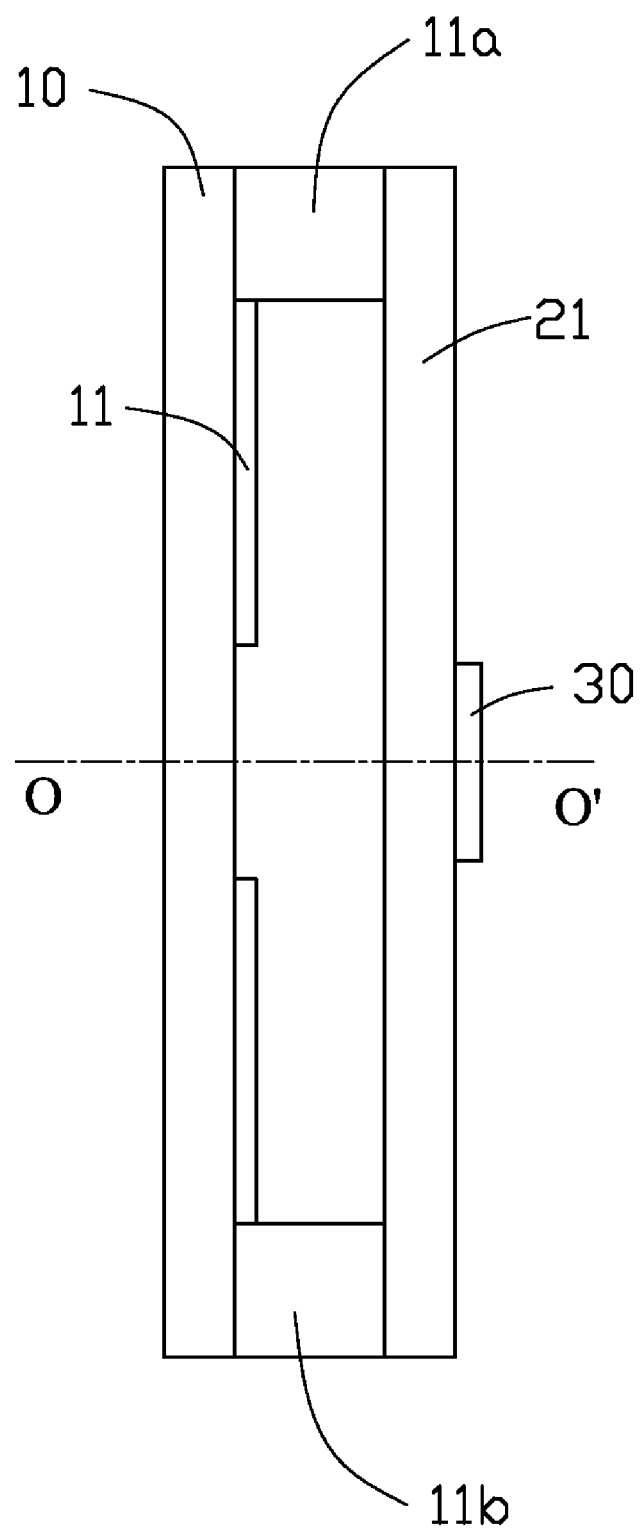
FIG. 3 is a side view of the focus module of FIG. 1 at a first state.
Figure 4:
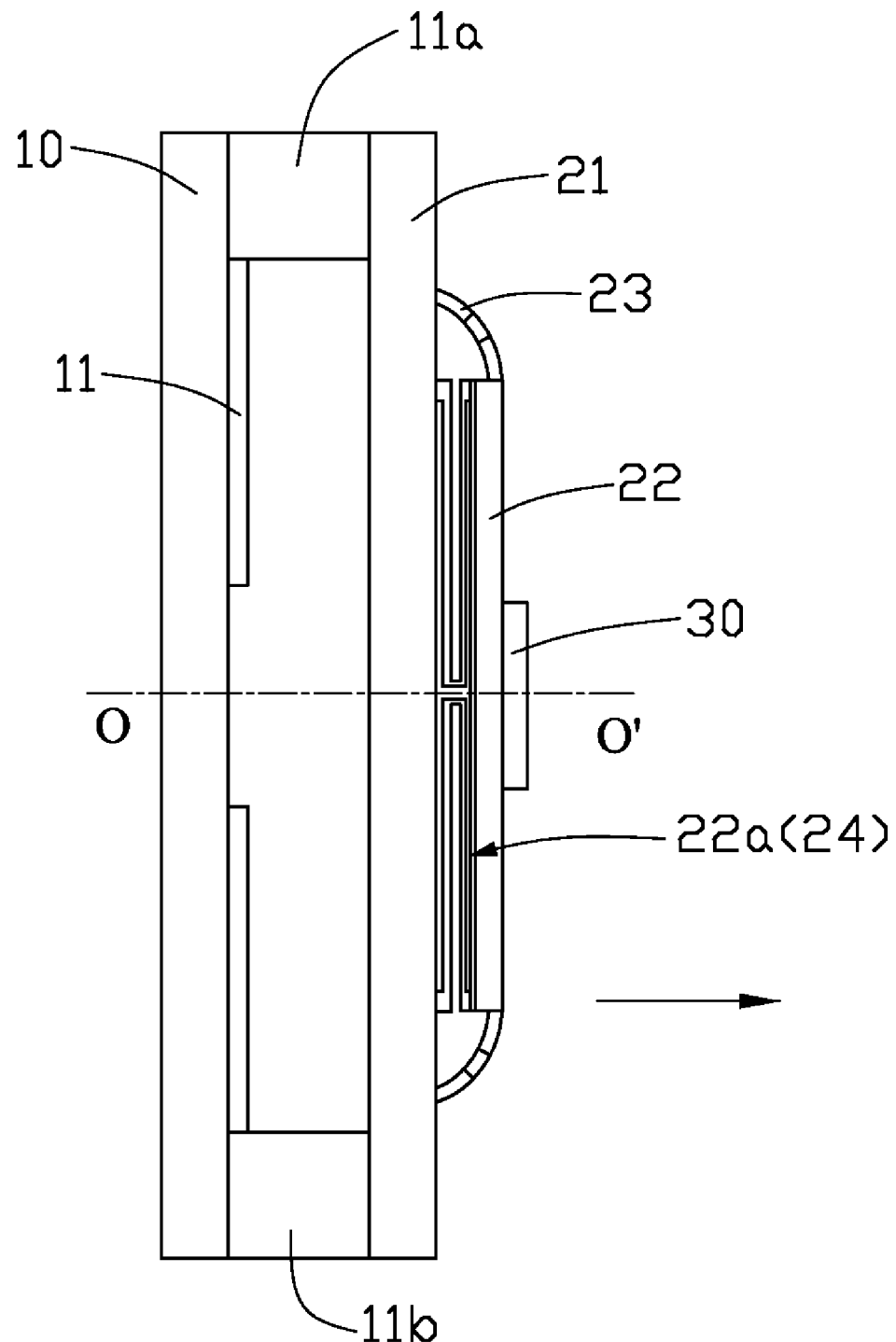
FIG. 4 is a side view of the focus module of FIG. 1 at a second state.
Figure 5:
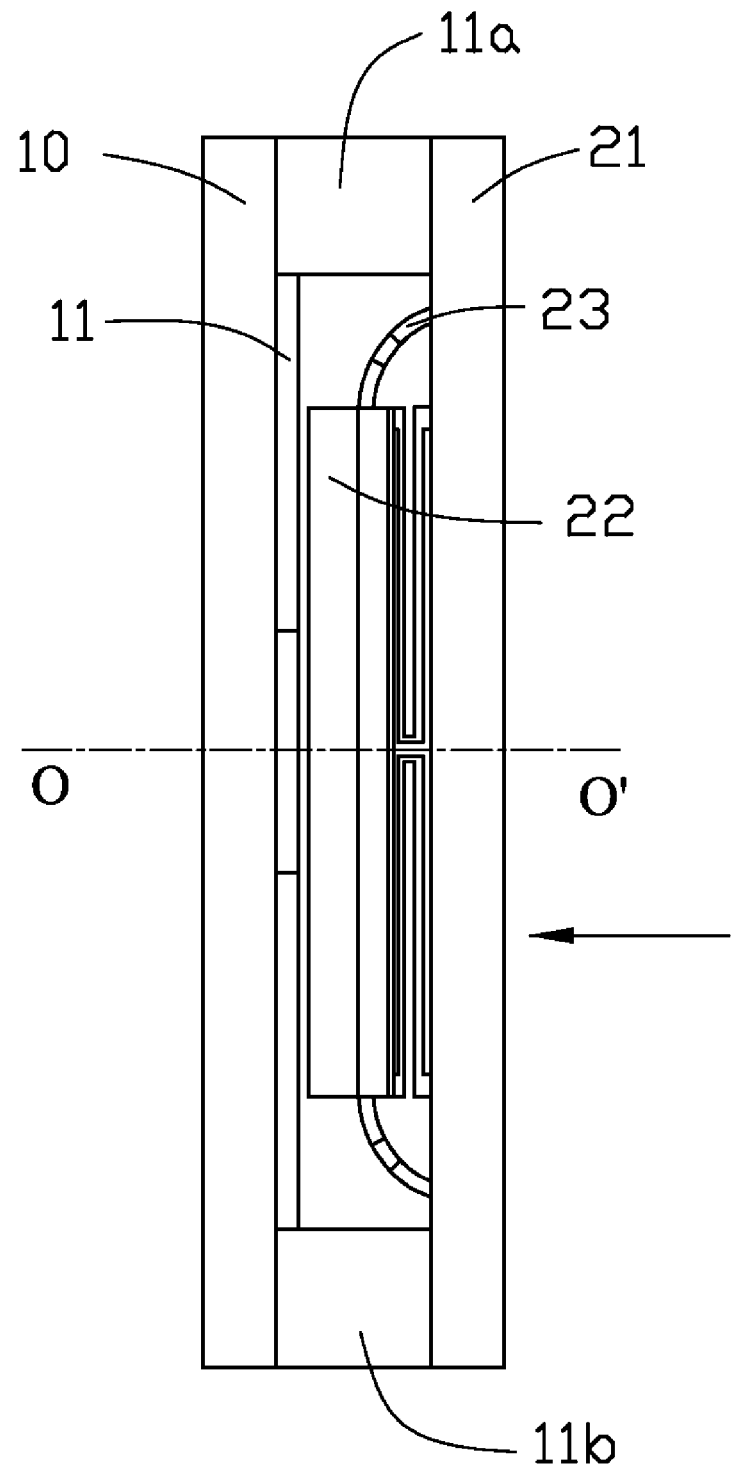
FIG. 5 is a side view of the focus module of FIG. 1 at a third state.

Referring to FIGS. 3, 4, and 5, the second magnet 24 is a magnet coil or a permanent magnet. In the present embodiment, the second magnet 24 has a film-like structure and may be a permanent magnet made of ferromagnetic materials such as nickel or a nickel alloy. The second magnet 24 can be attached to the holder 22 using glue. The second magnet 24 also can be mechanically fixed on the holder 22. In the present embodiment, the magnetic element 24 is fixed on the second surface 22a of the holder 22 facing the first magnets 11 of the substrate 10.

When the focus module 1 is working, the input terminal 11a, 11b can input current from different directions to control the polarity of the first magnets 11. Interaction between the magnetic fields of the first and second magnets 11, 24 can be controlled by varying the amount of attraction or repulsion therebetween according to strength and direction of the current. And the lens 30 moves with the second magnets 24 along the optical axis OO' to focus.

Referring to FIGS. 6 to 18, a method of manufacturing the focus module 1 is shown. The method includes the following steps.

Figure 6:
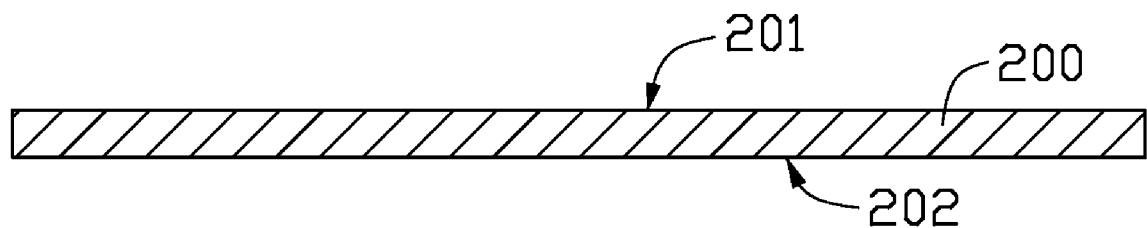
FIGS. 6 to 18 are cross-sectional views showing a method for manufacturing the focus module of FIG. 1 according to an exemplary embodiment.

Referring to FIG. 6, providing a first wafer 200. The first wafer 200 includes a first surface 201, and a second surface 202 opposite to the first surface 201.

Figure 7:
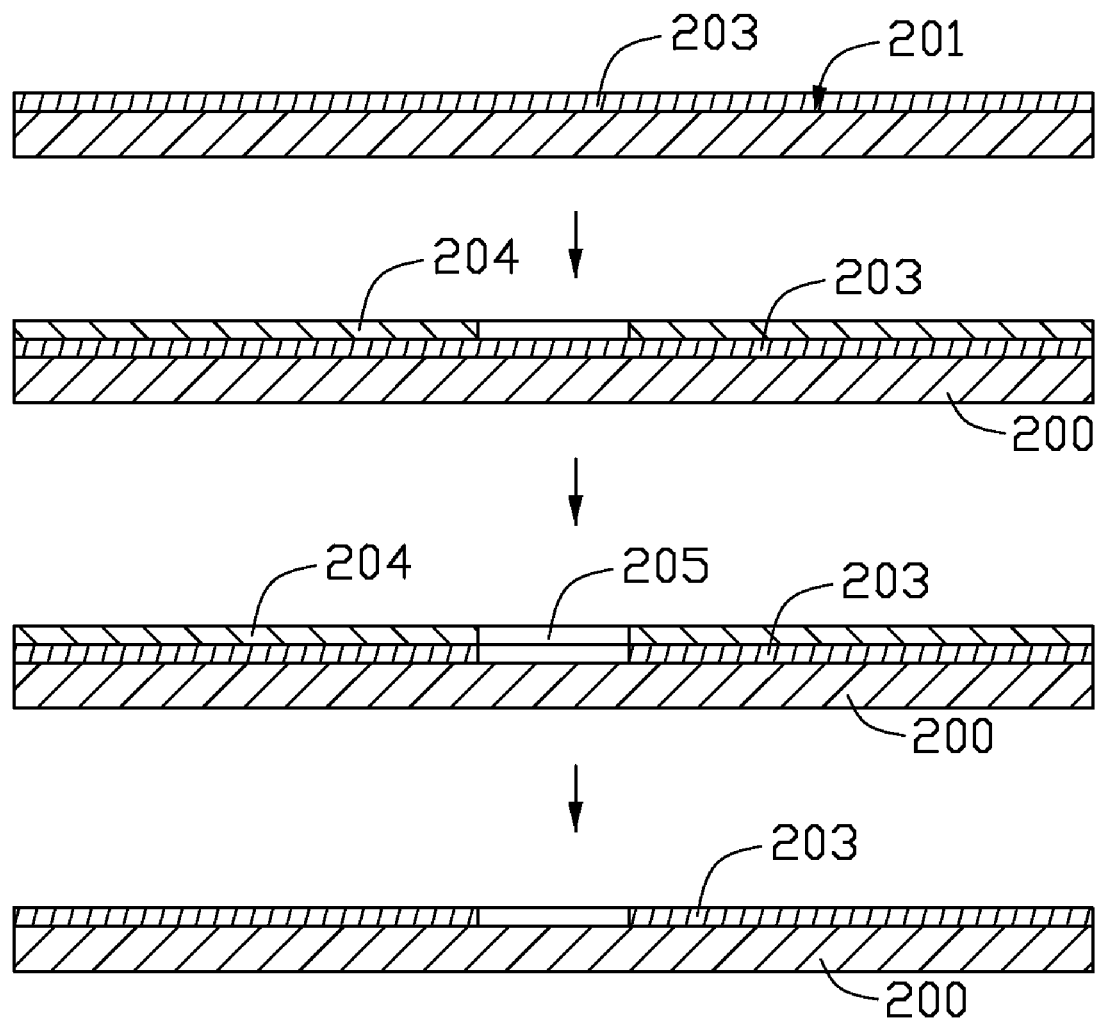

Referring to FIG. 7, defining a position of an aperture 10b. A first metal film 203 is firstly formed on the first surface 201 by sputter coating or evaporation coating. In the present embodiment, the first metal film 203 is made of aluminum. And the first metal film 203 is formed on the first surface 201 by sputter coating. Then, a first photoresist layer 204 is formed on the first metal film 203. The first photoresist layer 204 is exposed to yellow light through a mask (not show) having a pre-printed pattern. After exposing, the first metal film 203 is etched by coupled plasma to form a first hole 205. The first hole 205 is the position of an aperture 10b at the side of the first surface 201. Then, the unnecessary photoresist 204 is removed. The first photoresist layer 204 can use a positive photoresist or a negative photoresist. In the present embodiment, the first photoresist layer 204 is a negative photoresist.

Figure 8:
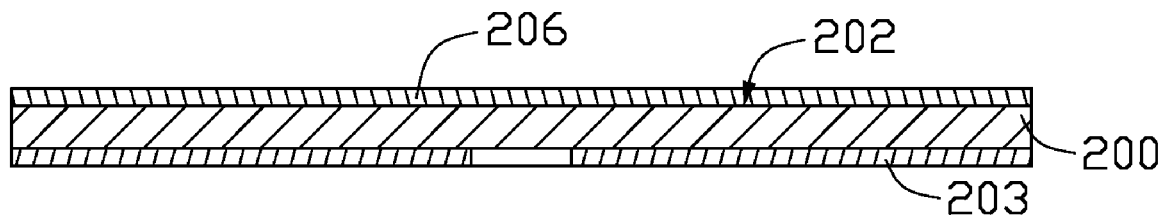

Referring to FIG. 8, forming a first insulation film 206 on the second surface 202 of the first wafer 200. In the present embodiment, a silicon nitride layer is deposited on the second surface 202 as the first insulation film 206 by chemical vapor deposition.

Figure 9:
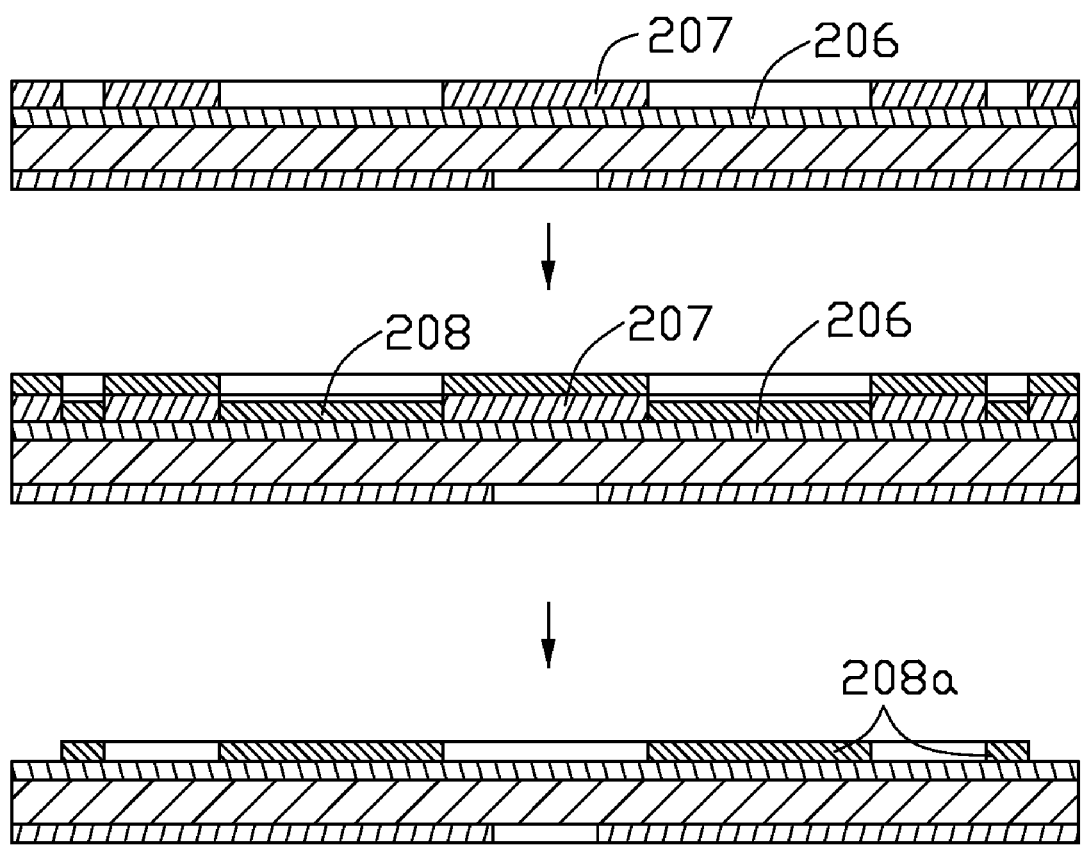

Referring to FIG. 9, forming a conducting wire 208a on the first insulation film 206. A second photoresist layer 207 is formed on the first insulation film 206, and exposed to yellow light through a mask (not show) with a pre-printed circuit pattern. Then the second photoresist layer 207 is developed and etched by coupled plasma to form a circuit pattern. A second metal film 208 is disposed on the photoresist layer 207. After that, the second photoresist layer 207 with portion second metal film 208 formed thereon is removed to form the conducting wire 208a formed on the first insulation film 206. The second photoresist layer 207 can use a positive photoresist or a negative photoresist. In the present embodiment, the second photoresist layer 207 using a negative photoresist.

Figure 10:
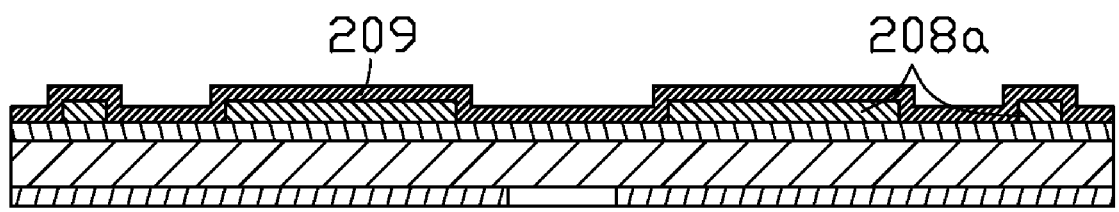

Referring to FIG. 10, forming a second insulation film 209. In the present embodiment, a silicon nitride layer is deposited on the conducting wire 208a and the first insulation film 206 as the second insulation film 209 by chemical vapor deposition.

Figure 11:
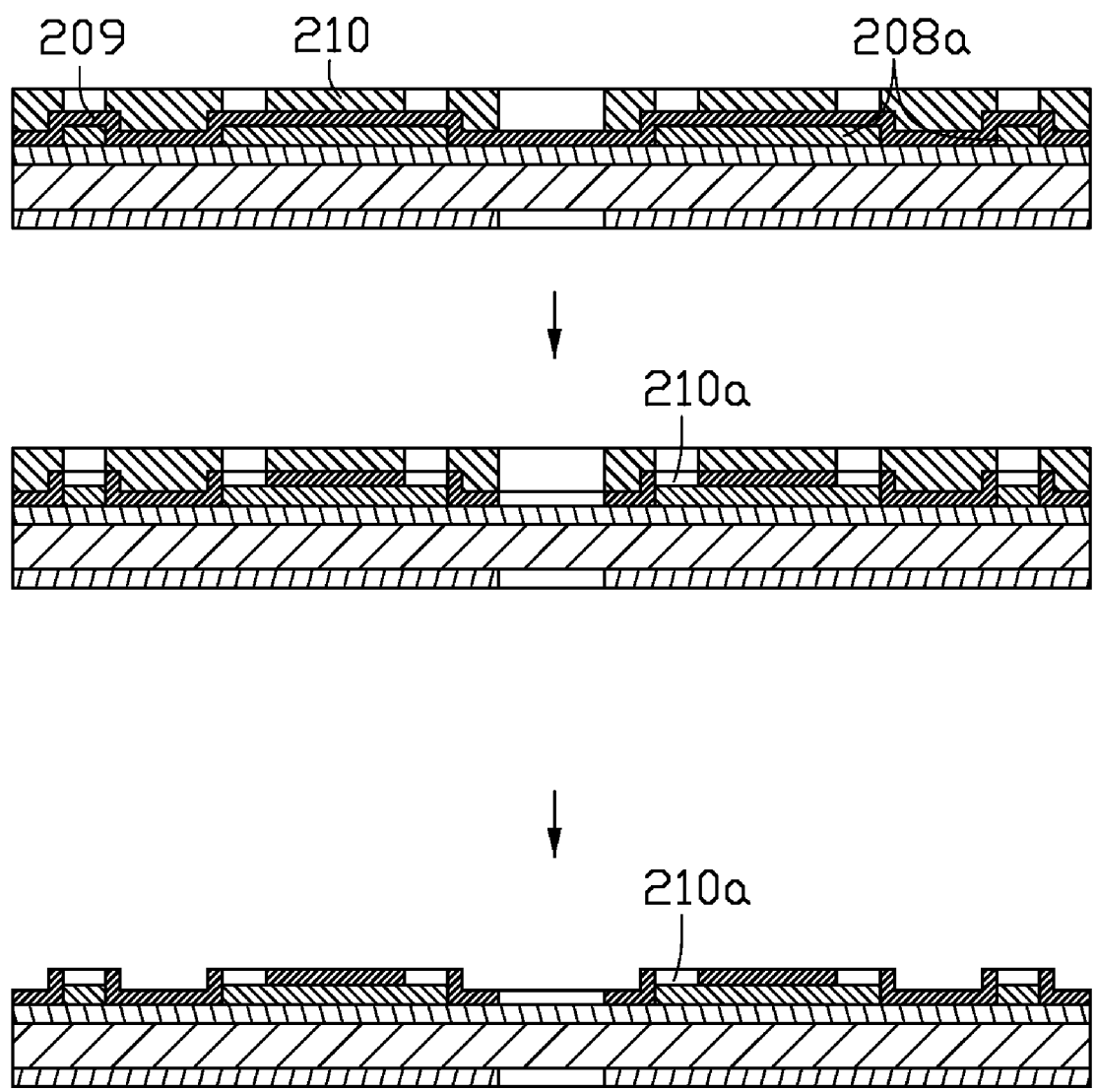

Referring to FIG. 11, forming a connecting channel 210a connecting the conducting wire 208a to the first magnets 11. The connecting channel 210a fabrication process includes: spreading a third photoresist layer 210 on the second insulation film 209, exposing the third photoresist layer 210 to yellow light through a mask (not show) with a pre-printed pattern, developing and etching the third photoresist layer 210 by coupled plasma to form the connecting channel 210a. After that, the third photoresist layer 210 is removed. The third photoresist layer 210 can be a positive photoresist or a negative photoresist. In the present embodiment, the third photoresist layer 210 is a negative photoresist.

Figure 12:
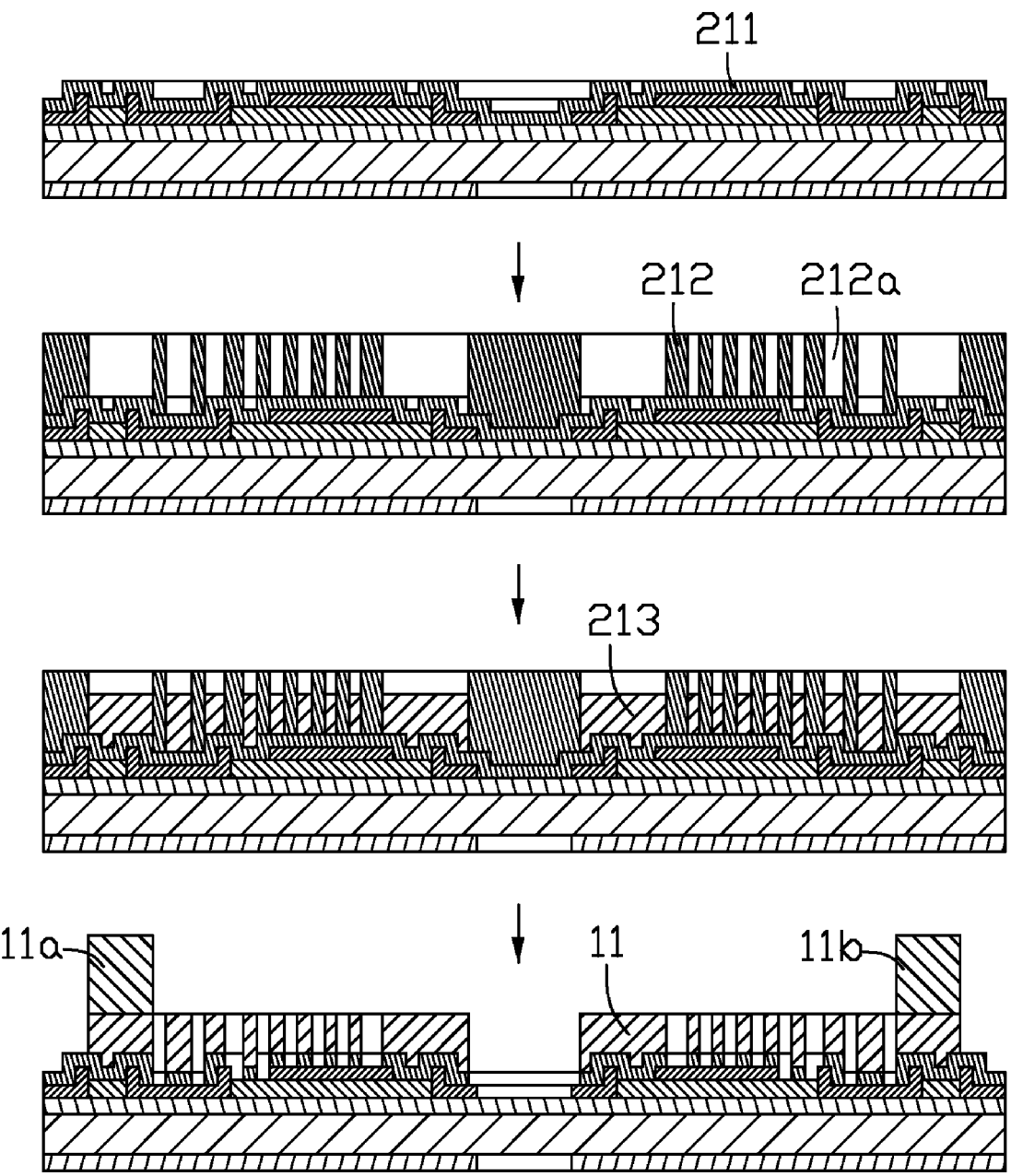

Referring to FIG. 12, forming the first magnets 11 and the input terminals 11a, 11b. In order to apply copper coating more easily, a first coating substrate 211 is firstly coated on the conducting wires 208a with a preset pattern. The first coating substrate 211 can be made of gold or titanium. In the present embodiment, the first coating substrate 211 is made of gold. A fourth photoresist layer 212 is spread on the first coating substrate 211. The fourth photoresist layer 212 is exposed to yellow light through a mask (not show) having a pre-printed coil pattern. After exposing, the fourth photoresist layer 212 is developed and, etched by coupled plasma etching to define a spiral groove 212a for the first magnets 11. A coat of metal material 213 is applied in the spiral groove 212a. Then the photoresist layer 212 is removed to form the first magnets 11, and the first coating substrate 211, which is not coated with the metal material 213 11 is etched. The four photoresist layer 212 can use a positive photoresist or a negative photoresist. In the present embodiment, the four photoresist layer 212 is made of a negative photoresist. At last, forming two input terminals 11a, 11b on the first magnets 11.

Figure 13:
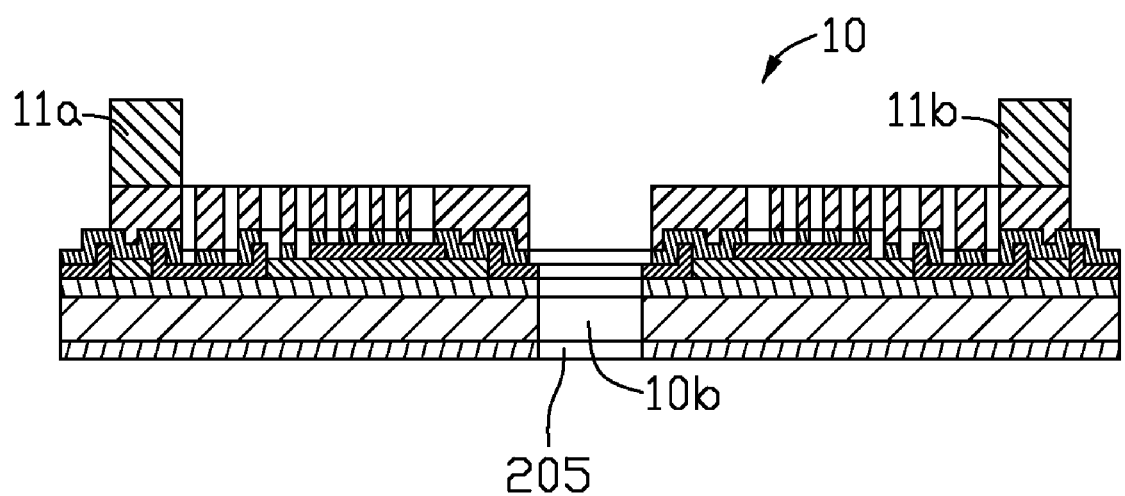

Referring to FIG. 13, forming the aperture 10b. In the present embodiment, the aperture 10b is formed at the position of the first hole 205. The aperture 10b is formed on the first surface 201 by coating, lithography and etching processes. After above steps, the substrate 10 is completely formed.

Figure 14:
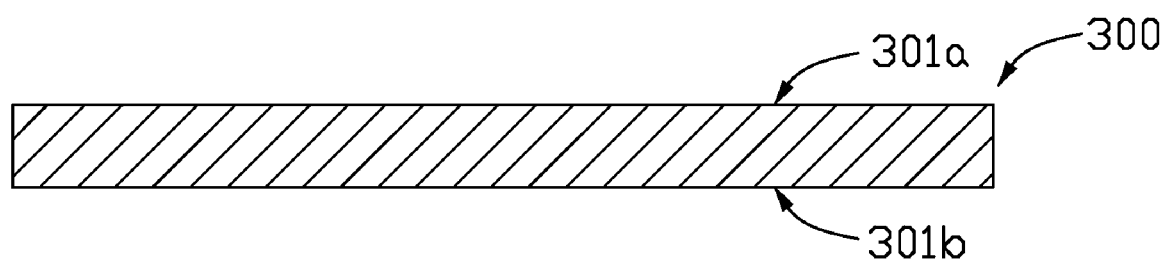

Referring to FIG. 14, providing a second wafer 300. The second wafer 300 includes a third surface 301a, and a fourth surface 301b opposite to the third surface 301a.

Figure 15:
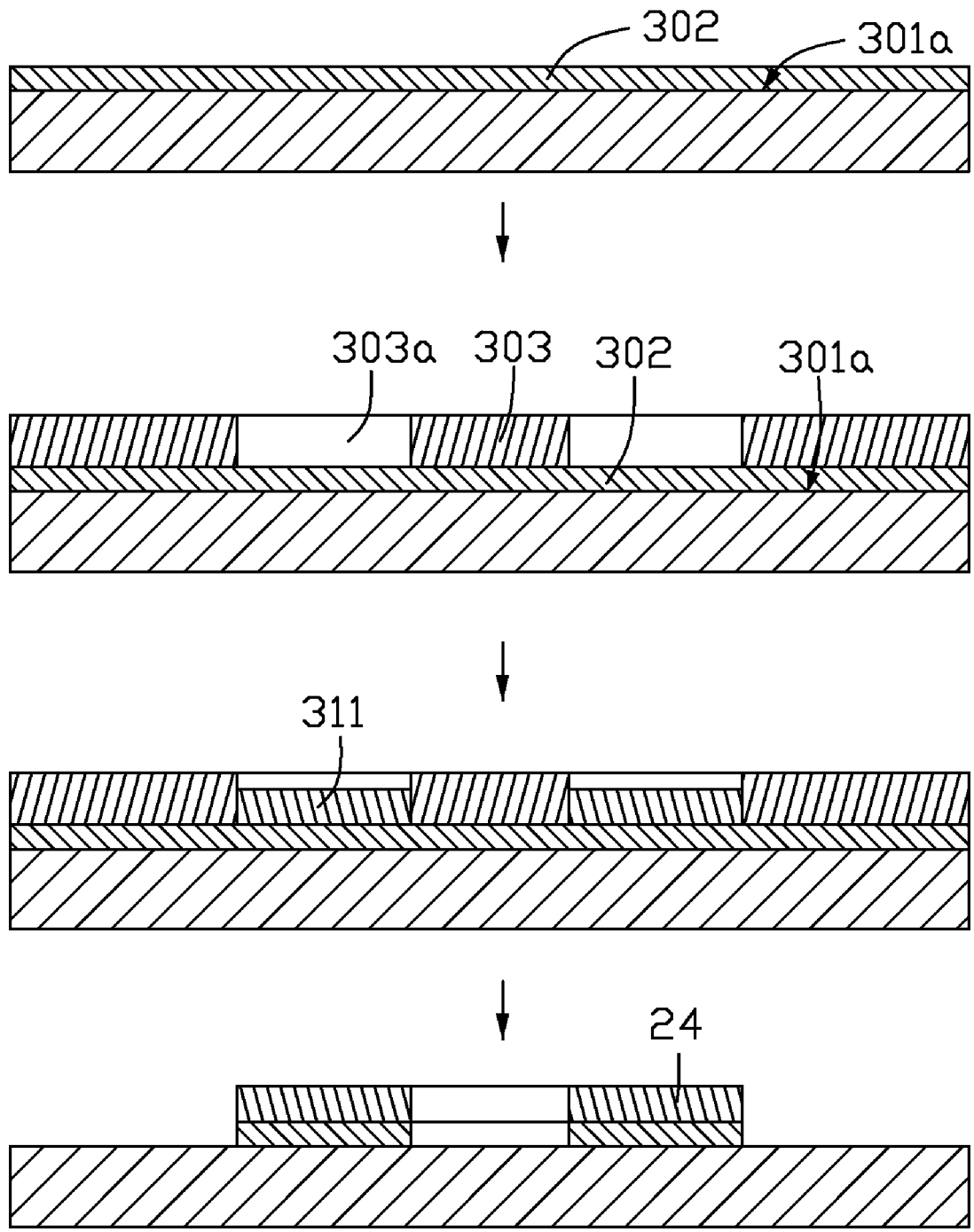

Referring to FIG. 15, forming the second magnet 24. In order to apply nickel coating more easily, a second coating substrate 302 is firstly coated on the third surface 301a. The second coating substrate 302 can be made of gold or titanium. In the present embodiment, the second coating substrate 302 is made of gold. A fifth photoresist layer 303 is spread on the second coating substrate 302. The fifth photoresist layer 303 is exposed to yellow light through a mask (not show) having a pre-printed coil pattern. After exposing, the fifth photoresist layer 303 is developed, etched by coupled plasma etching to define a number of second grooves 303a for the second magnets 24. A nickel metal 311 is coated in the second grooves 303a to form the second magnets 24. Then the unnecessary part of the fifth photoresist layer 303 and the second coating substrate 302 coated by the fifth photoresist layer 303 are removed. The fifth photoresist layer 303 can use a positive photoresist or a negative photoresist. In the present embodiment, the fifth photoresist layer 303 is made of a negative photoresist.

Figure 16A:
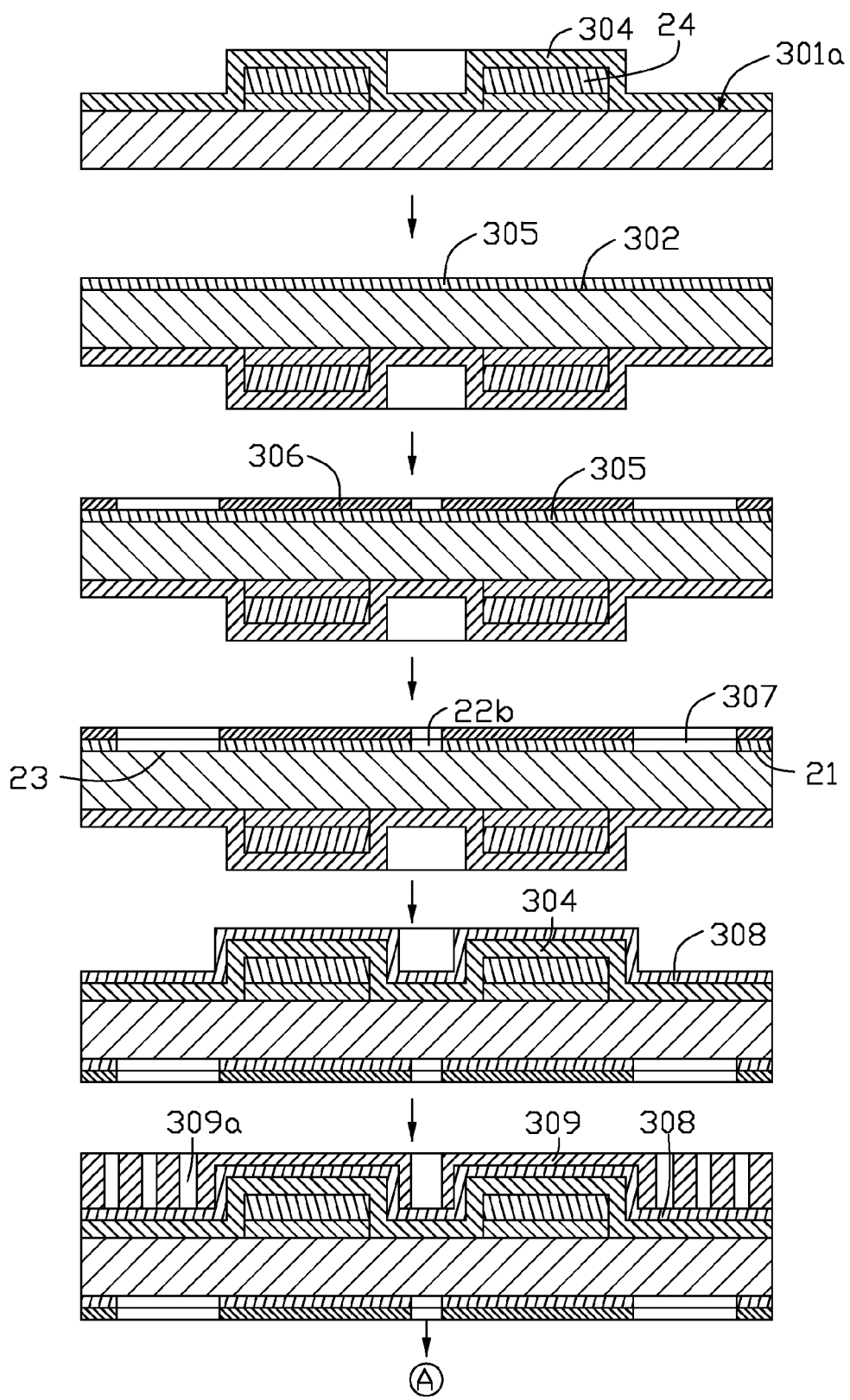
Figure 16B:
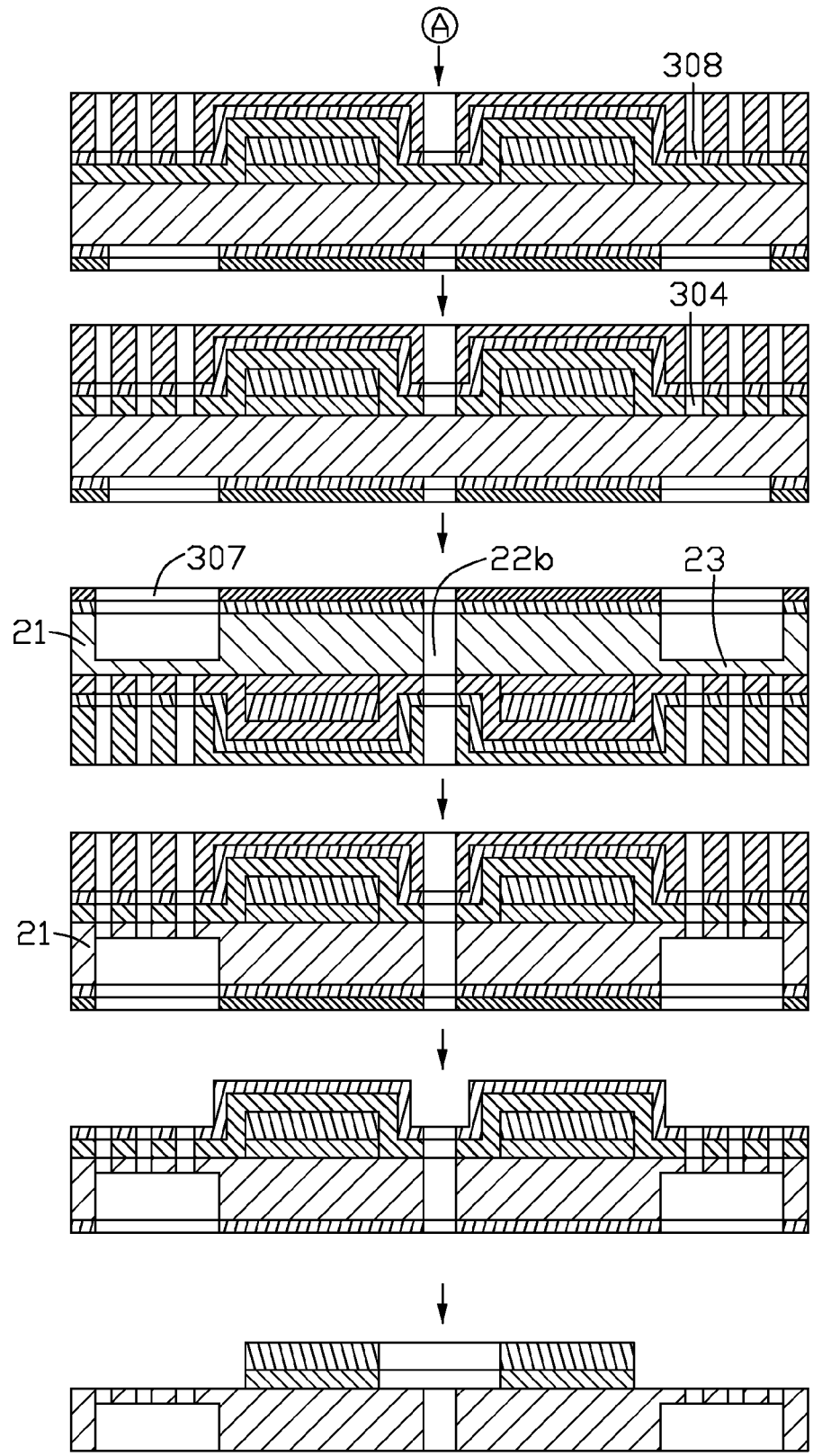

Referring to FIGS. 16A and 16B, forming the elastic elements 23 and the holding hole 22b. In order to apply aluminium coating more easily, a third coating substrate 304 is firstly coated on the third surface 301a and the second magnets 24. The third coating substrate 304 can be made of gold or titanium. In the present embodiment, the third coating substrate 304 is made of gold. A third metal film 305 is formed on the fourth surface 301b of the second wafer 300. The third metal film 305 can be manufactured by sputter coating or evaporation coating. In the present embodiment, the third metal film 305 is manufactured by sputter coating. A sixth photoresist layer 306 is spread on the third metal film 305. The sixth photoresist layer 306 is exposed, developed, and etched to form a number of third grooves 307 for defining the position of the elastic elements 23, the holding hole 22b, and the frame 21. The fourth metal film 308 is formed on the third coating substrate 304. The sixth photoresist layer 306 can use a positive photoresist or a negative photoresist. In the present embodiment, the sixth photoresist layer 306 is made of a negative photoresist. In the present embodiment, the fourth metal film 308 is made of aluminium. The shape of each elastic element 23 is defined through a lithography and etching process. A seventh photoresist layer 309 is spread on the fourth metal film 308. The seventh photoresist layer 309 is exposed developed and etched to form a number of elastic element grooves 309a for defining the shape of the elastic element 23. The seventh photoresist layer 309 can use a positive photoresist or a negative photoresist. In the present embodiment, the seventh photoresist layer 309 is made of a negative photoresist. The fourth metal film 308 and the third coating substrate 304 are etched to define the shape of the elastic element 23 again by coupled plasma etching process. The second wafer 300 is etched from the third groove 307 to form the elastic element 23, the holding hole 22b and the frame 21. Unnecessary part of the seventh photoresist layer 309, the third coating substrate 304, and the third metal film 305 are removed.

Figure 17:
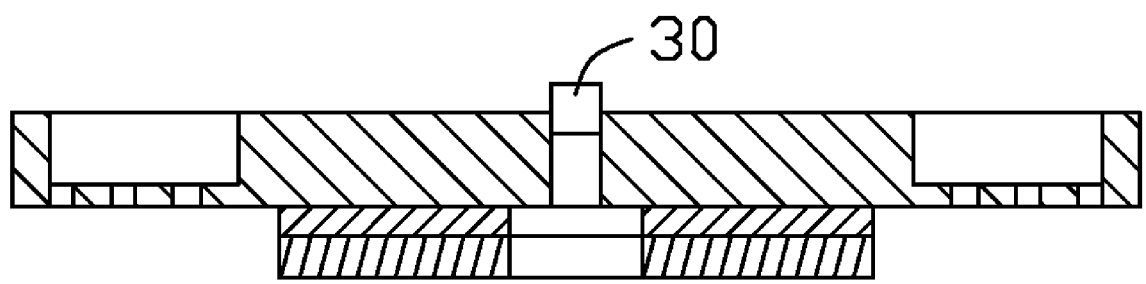

Referring to FIG. 17, fixing the lens 30. The lens 30 is fixed in the holding hole 22b by glue.

Figure 18:
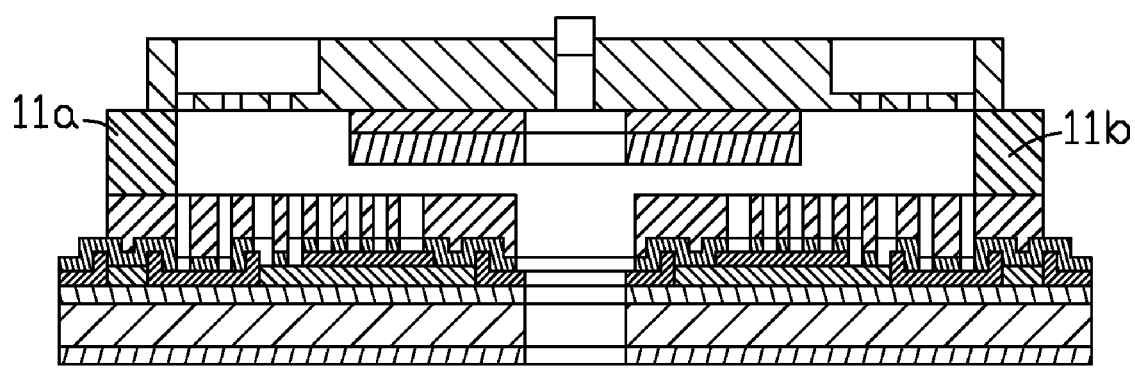

Referring to FIG. 18, fixing the frame 21. The frame 21 is attached to the signal input terminals 11a, 11b by glue.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A focus module comprising:
    a substrate with at least one first magnet formed thereon and an aperture therein;
    a frame fixed on the substrate and defining a hole aligning with the aperture of the substrate;
    a holder with a lens received therein positioned on the substrate and received in the hole of the frame;
    at least one second magnet corresponding to the first magnet being fixed on the holder and facing the at least one first magnet, and the at least one first magnet and the at least one second magnet being electromagnets; and
    an elastic element connecting the holder to the frame, the elastic element being strip-shaped and comprising a first end fixed to the side surface of the holder, a second end fixed on the inner surface of the hole, and at least one U-shape bend connecting the first and second ends, two sides of the U-shape bend paralleling to the side surface of the holder and the inner surface of the hole to make the holder capable of movable relative to the substrate along an optical axis of the lens.

2. The focus module as claimed in claim 1, wherein each of the at least one second magnet is a film shape, and each of the at least one first magnet is a magnet coil.

3. The focus module as claimed in claim 2, wherein the at least one first magnet comprises a signal input terminal and a signal output terminal.

4. The focus module as claimed in claim 1, wherein the at least one first magnet is a magnet coil, and the at least one second magnet is a ring magnet.

5. The focus module as claimed in claim 4, wherein the at least one first magnet comprises a signal input terminal and a signal output terminal.

6. The focus module as claimed in claim 1, wherein the number of the first magnet is four, and the four second magnets are positioned around the aperture.

7. The focus module as claimed in claim 6, wherein the hole of the frame, the aperture of the substrate are coaxial with the optical center of the lens.

8. The focus module as claimed in claim 6, wherein the four second magnets are in a rectangular arrangement surrounding the aperture.

9. The focus module as claimed in claim 1, wherein the number of the second magnet is one, and the one second magnet is positioned surrounding the aperture.

10. The focus module as claimed in claim 1, wherein the frame, the holder, and the elastic element are integrally formed.

11. A fabrication method of a focus module comprising:
    providing a first wafer comprising a first surface and a second surface opposite to the first surface;
    forming a first insulation film on the second surface of the first wafer;
    forming a conducting wire on the first insulation film;
    forming a second insulation film on the first insulation film;
    forming a connecting channel on the second insulation film exposing the conducting wire;
    forming first magnets on the second insulation film, and the first magnets connecting to the conducting wire through the connecting channel;
    defining an aperture on the first surface;
    providing a second wafer comprising a third surface and an opposite fourth surface;
    forming a second magnet at the third surface of the second wafer;
    forming an elastic element and a frame receiving the elastic element, and defining a holding hole at the fourth surface of the second wafer;
    providing a lens fixed in the holding hole;
    fixing the frame on the first wafer.

12. The method as claimed in claim 11, wherein the aperture is defined on the first surface by coating process and lithography and etching processes.

13. The method as claimed in claim 11, wherein the first magnets are formed by lithography and etching processes.

14. The method as claimed in claim 11, wherein the second magnet is formed at the third surface of the second wafer by lithography process.

* * * * *